United States Patent
Wu et al.

(10) Patent No.: US 11,506,495 B2
(45) Date of Patent: Nov. 22, 2022

(54) INJECTION LOCKING RESONATOR FIBER OPTIC GYROSCOPE

(71) Applicant: Honeywell International Inc., Morris Plains, NJ (US)

(72) Inventors: Jianfeng Wu, Tucson, AZ (US); Karl D. Nelson, Plymouth, MN (US); Matthew Wade Puckett, Phoenix, AZ (US); Glen A. Sanders, Scottsdale, AZ (US); Lee K. Strandjord, Tonka Bay, MN (US)

(73) Assignee: Honeywell International Inc., Charlotte, NC (US)

( * ) Notice: Subject to any disclaimer, the term of this patent is extended or adjusted under 35 U.S.C. 154(b) by 163 days.

(21) Appl. No.: 16/940,223

(22) Filed: Jul. 27, 2020

(65) Prior Publication Data

US 2022/0026211 A1 Jan. 27, 2022

(51) Int. Cl.
*G01C 19/72* (2006.01)
*H01S 3/10* (2006.01)
*H01S 3/30* (2006.01)

(52) U.S. Cl.
CPC ......... *G01C 19/721* (2013.01); *G01C 19/727* (2013.01); *H01S 3/10092* (2013.01); *H01S 3/302* (2013.01)

(58) Field of Classification Search
CPC ............................ G01C 19/721; G01C 19/727
See application file for complete search history.

(56) References Cited

U.S. PATENT DOCUMENTS

| 5,134,622 A | 7/1992 | Deacon |
| 8,736,845 B2 | 5/2014 | Wu et al. |

(Continued)

FOREIGN PATENT DOCUMENTS

| CN | 1264000 C | 7/2006 | |
| CN | 107843248 A | * 3/2018 | ........... G01C 19/721 |

(Continued)

OTHER PUBLICATIONS

Shi, Chao-Xiang et al. "New interferometric fiber-optic gyroscope with amplified optical feedback". Applied Optics, vol. 35, No. 3, Jan. 20, 1996, pp. 381-387. (Year: 1996).*

(Continued)

*Primary Examiner* — Michael A Lyons
(74) *Attorney, Agent, or Firm* — Fogg & Powers LLC

(57) ABSTRACT

Systems and methods for an injection locking RFOG are described herein. In certain embodiments, a system includes an optical resonator. The system also includes a laser source configured to launch a first laser for propagating within the optical resonator in a first direction and a second laser for propagating within the optical resonator in a second direction that is opposite to the first direction, wherein the first laser is emitted at a first launch frequency and the second laser is emitted at a second launch frequency. Moreover, the system includes at least one return path that injects a first optical feedback for the first laser and a second optical feedback for the second laser, from the optical resonator, into the laser source, wherein the first and second optical feedbacks respectively lock the first and second launch frequencies to first and second resonance frequencies of the optical resonator.

18 Claims, 5 Drawing Sheets

(56) References Cited

U.S. PATENT DOCUMENTS

| | | |
|---|---|---|
| 9,772,189 B2 | 9/2017 | Strandjord et al. |
| 2004/0264977 A1 | 12/2004 | Yap et al. |
| 2007/0133003 A1* | 6/2007 | Sanders .............. G01C 19/727 356/461 |
| 2009/0232172 A1* | 9/2009 | Masuda ................ H01S 3/1396 372/32 |
| 2011/0255094 A1 | 10/2011 | Mohageg et al. |

FOREIGN PATENT DOCUMENTS

| | | |
|---|---|---|
| CN | 110470292 A | 11/2019 |
| EP | 2333483 A2 | 6/2011 |
| EP | 3093618 A1 | 11/2016 |
| JP | 2000171261 A * | 6/2000 |

OTHER PUBLICATIONS

European Patent Office, "Extended European Search Report from EP Application No. 21184889.0", from Foreign Counterpart to U.S. Appl. No. 16/940,223, dated Dec. 20, 2021, pp. 1 through 8, Published: EP.

* cited by examiner

INJECTION LOCKING RESONATOR FIBER OPTIC GYROSCOPE

BACKGROUND

Gyroscopes (also widely referred to as gyros) have been used to measure rotation rates or changes in angular velocity about an axis of rotation. A basic conventional fiber optic gyro (FOG) may include a light source, a beam generating device, and a coil of optical fiber coupled to the beam generating device that encircles an area. The beam generating device may transmit light beams into the coil that propagate in a clockwise (CW) direction and a counterclockwise (CCW) direction along the core of the optical fiber. Many FOGs utilize glass-based optical fibers that guide light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In an optical resonator fiber optic gyroscope (RFOG), the counter-propagating light beams are typically highly coherent and circulate through multiple turns of the fiber optic coil and for multiple passes through the coil using a device, such as a fiber coupler, that redirects a portion of the light that has passed through the coil back into the coil again (i.e., circulates the light). The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition. This constructive interference condition arises when the light-waves traverse the coil a different number of times and become in phase with one another. When the light is circulating in phase within the coil, the light will add constructively at any point within the coil. As a result of this constructive interference condition, an optical wave having a wavelength A is referred to as "on resonance" when the round-trip resonator optical pathlength is equal to an integral number of the wavelength A.

Rotation about the axis of the coil produces a different optical pathlength for CW and CCW propagation. The difference in optical pathlength causes the CW and CCW resonance frequencies of the optical resonator to change. The difference between the CW and CCW resonance frequencies can be measured by detecting CW and CCW propagating light beams that have been tuned to match their respective resonance frequency of the closed optical path. The measured difference can then be used to calculate the rotation rate.

SUMMARY

Systems and methods for an injection locking RFOG are described herein. In certain embodiments, a system includes an optical resonator. The system also includes at least one laser source configured to launch a first laser for propagating within the optical resonator in a first direction and launch a second laser for propagating within the optical resonator in a second direction that is opposite to the first direction, wherein the first laser is emitted by the at least one laser source at a first launch frequency and the second laser is emitted by the at least one laser source at a second launch frequency. Moreover, the system includes at least one return path that injects a first optical feedback, associated with the first laser, and a second optical feedback, associated with the second laser, from the optical resonator into the at least one laser source, wherein the first optical feedback locks the first launch frequency to a first resonance frequency of the optical resonator and the second optical feedback locks the second launch frequency to a second resonance frequency of the optical resonator.

DRAWINGS

Understanding that the drawings depict only some embodiments and are not, therefore, to be considered limiting in scope, the exemplary embodiments will be described with additional specificity and detail using the accompanying drawings, in which.

Per common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods described herein provide for an injection locking resonator fiber optic gyroscope (RFOG). For example, a laser source may be a single laser source or multiple laser sources. The laser source may produce one or more lasers near or at a resonance frequency of an optical resonator, which lasers are respectively coupled into an optical resonator in a clockwise (CW) and a counterclockwise (CCW) direction. The lasers propagating within the optical resonator are coupled out of the optical resonator and coupled, as an input, back into the laser source. As the laser source produces a laser that is near the resonance frequency of the optical resonator and the laser coupled from the optical resonator into the laser source is at the resonance frequency, the lasers produced by the laser source may lock to the resonance frequencies provided from the optical resonator. In other words, the laser frequency is no longer fixed by the laser cavity. The light that is coupled into the laser cavity carries the resonance information of the external resonator and plays a vital role in determining the laser frequency and phase noise.

Frequently, RFOGs use relatively high-power lasers to improve the shot-noise limit called for by the angle random walk (ARW) to meet design requirements for different systems. However, the increased laser power may cause larger refractive index variation within the RFOG due to the Kerr effect. Some gyroscopes compensate for the Kerr effect by including high-quality intensity servo loops to reduce the bias instability caused by the laser intensity fluctuations. Also, RFOGs typically use complex loops to lock lasers to resonator resonance peaks, such as Pound-Drever-Hall (PDH) loops. By injection locking a laser produced by a laser source, an RFOG may be designed as described below that reduces the Kerr effect and allows for an operational RFOG that doesn't require high-quality locking loops.

Figure 1A:
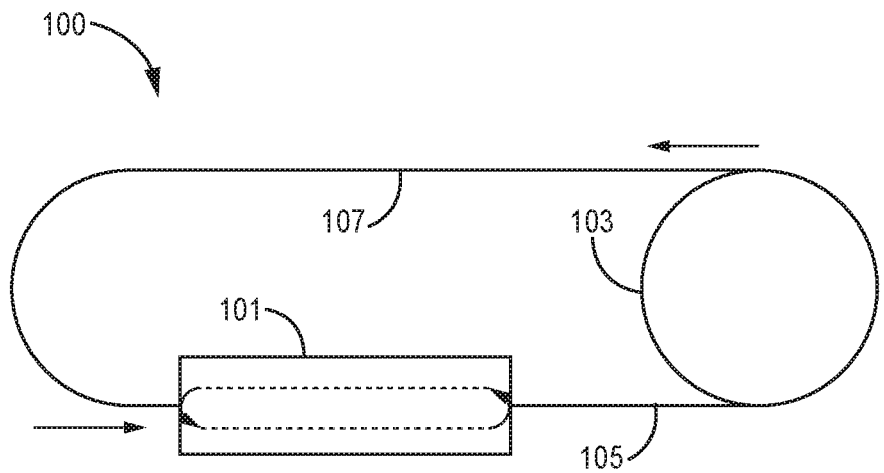
FIG. 1A is a diagram illustrating a system for injection locking a frequency of a laser using an optical resonator according to an aspect of the present disclosure.

FIG. 1A is a diagram illustrating a system 100 for injection locking a frequency of a laser produced by a laser source 101 using a laser fed back from an optical resonator 103. As shown, the system 100 includes a laser source 101. The laser source 101 may be capable of producing one or more lasers at different longitudinal modes. The laser source 101 may be a ring laser or linear laser source. The laser source 101 may be coupled through an optical path 105 to an optical resonator 103. When the frequency of the laser source 101 is within the resonance peak of the optical resonator 103, a portion of the received laser may resonate within the optical resonator 103 at a resonance frequency, where the resonance frequency is dependent upon the periodic length of the fiber within the optical resonator 103 and the wavelength of a laser propagating therein. Further, the optical resonator 103 may provide an output laser at the resonance frequency from an output that is coupled through the optical path 107 to an input of the laser source 101. Both the reflection and transmission port of the optical resonator 103 may be used to provide feedback to the laser source 101. Some embodiments, such as the embodiment shown in FIG. 1A, use the transmission port for providing feedback because the output from the reflection port may contain some mode distortion due to mode mismatch.

In certain embodiments, the output laser provided by the optical resonator 103 to the laser source 101 through the optical path 107 may injection lock the laser produced by the laser source 101 to the resonance frequency of the optical resonator 103. As known to one having skill in the art, injection locking occurs when a first oscillator, producing a laser at a first frequency (a launch frequency), is disturbed by a second laser at a second frequency, where the second frequency is close to the first frequency. When the first and second frequencies are close enough to one another, the second laser may capture the first laser such that the frequencies of the first laser and the second laser become essentially identical. With regards to the system 100, the output light provided by the optical resonator 103 at the resonance frequency of the optical resonator 103 may capture the laser produced by the laser source 101 such that the laser produced by the laser source 101 is substantially equivalent to the resonance frequency of the optical resonator 103.

Figure 1B:
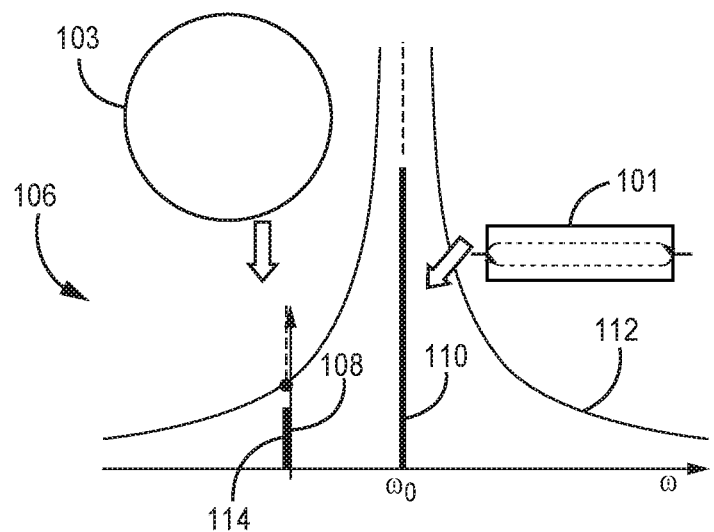
FIG. 1B is a graph illustrating the effects of injection locking a frequency of a laser using an optical resonator according to an aspect of the present disclosure.

FIG. 1B is a graph 106 illustrating the effects of injection locking within the system 100. As shown, the laser source 101 may produce laser light having various frequency components along the gain curve 112. Upon startup, the laser source 101 may produce a laser at an initial launch frequency ($\omega_0$) 110 that is supported by a stand-alone laser cavity. When the launch frequency 110 is getting close to the resonance peak frequency 114 of the optical resonator 103, the laser may then propagate around the optical resonator 103. The phase and intensity of the output beam follow the transmission function of the optical resonator 103, which means the optical resonator 103 provides the strongest feedback at the resonance peak frequency 114. Accordingly, the original laser light at the initial launch frequency 110 may fail to be regeneratively amplified due to a lack of feedback. In certain embodiments, the feedback near resonance frequency 114 may perturb the laser provided by the laser source 101 such that the launch frequency of the laser source 101 moves from the initial launch frequency 110 towards an injection-locked frequency 108. As shown, the injection-locked frequency 108 is substantially equal to the resonance frequency 114. Thus, the laser source 101 may provide a laser at a launch frequency that is locked to the resonance frequency 114.

In certain embodiments, the motion of the optical resonator 103 may be coupled to the motion of an object. For example, when the object is rotating about an axis, the optical resonator 103 may similarly rotate about an axis. In some configurations, when the optical resonator 103 rotates about an axis, the length of the optical path through the optical resonator 103 may change. As the optical path through the optical resonator 103 changes, so does the resonance frequency 114 of the optical resonator 103. Also, as the resonance frequency 114 changes, the laser coupled from the optical resonator 103 into the laser source 101 will cause the frequency of the laser provided by the laser source 101 to lock to the changing resonance frequency 114 of the optical resonator 103.

Figure 2:
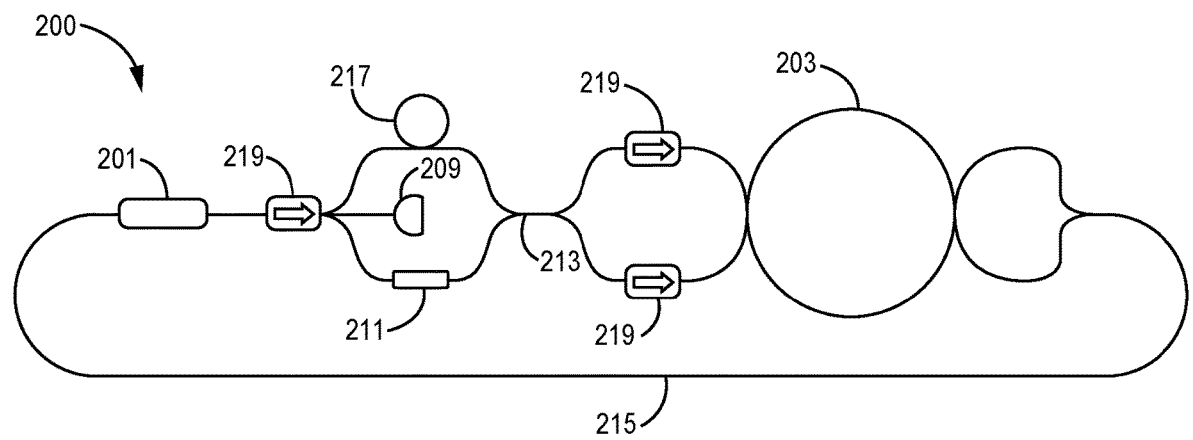
FIG. 2 is a diagram illustrating an embodiment of an injection-locked RFOG according to an aspect of the present disclosure.

FIG. 2 is a diagram illustrating an embodiment of an injection-locked RFOG 200. As shown, the RFOG 200 may include a laser source 201 and an optical resonator 203 that functions similarly as described above with respect to the laser source 101 and the optical resonator 103. However, in certain embodiments, the laser source 201 may produce a laser that produces two longitudinal modes, where the longitudinal modes are separated by a free spectral range of the optical resonator 203. As used herein, a free spectral range of the optical resonator 203 may refer to the frequency difference between adjacent resonance frequencies of the optical resonator 203. Depending on the longitudinal mode, one portion of the laser produced by the laser source 201 may propagate in the CW direction around the optical resonator 203, and another portion of the laser may propagate in the CCW direction around the optical resonator 203.

In some embodiments, the output of the optical resonator 203 may be coupled through an optical path 215, where the optical path 215 is also coupled to an input of the laser source 201. As described above, the resonance frequency of the optical resonator 203 may be sufficiently proximate to the frequency of the lasers produced by the laser source 201 to lock the frequency of the laser produced by the laser source 201 to the resonance frequency of the optical resonator 203. Accordingly, as the RFOG 200 rotates about an axis, causing the resonance frequencies of the optical resonator 203 to change due to changes in the propagation length of the optical paths through the optical resonator 203, the lasers produced by the laser source 201 may also change with the changing resonance frequencies of the optical resonator 203.

In further embodiments, as the lasers produced by the laser source 201 track the changes in the resonance frequencies of the optical resonator 203 caused by the rotation of the RFOG 200, the lasers produced by the laser source 201 may be used to detect rotation of the RFOG 200. For example, the two longitudinal modes from the laser source 201 may provide the lasers to a rate detector 209. The rate detector 209 may be any device capable of detecting the lasers produced by the laser source 201 and determining rotation rates of the RFOG 200 based on the detected lasers. For example, the rate detector 209 may include a tap to extract some of the laser beams from the laser source 201. The multiple lasers produced by the laser source 201 interfere at detector 209 and generate a signal having a beat frequency that can be used for rotation rate calculation.

In some embodiments, the rate detector 209 may detect the lasers produced by the laser source 201 and provide the electrical signals to a processor. The processor may process information in the signals to calculate rotation rate information for the RFOG 200. As used herein, one or more computational devices, such as a processor or other computational device, used in the present system and methods may be implemented using software, firmware, hardware, circuitry, or any appropriate combination thereof. The one or more computational devices may be supplemented by, or incorporated in, specially-designed application-specific integrated circuits (ASICSs) or field programmable gate arrays (FPGAs). The one or more computational devices can also include or function with software programs, firmware, or other computer-readable instructions for carrying out various process tasks, calculations, and control functions that use the information provided by the RFOG 200.

Instructions for carrying out the various process tasks, calculations, and generation of other data associated with the processing of rotation rate information can be implemented in software, firmware, or other computer-readable instructions. These instructions are typically stored on any appropriate computer program product that includes a computer-readable medium used for storage of computer-readable instructions or data structures. Such a computer-readable medium can be any available media that can be accessed by a general-purpose or special-purpose computer or processor, or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

In certain embodiments, the RFOG 200 may couple the lasers produced by the laser source 201 into either the CW path or the CCW path through the optical resonator 203 based on the frequencies of the lasers. As stated above, the laser source 201 may produce lasers that are in different longitudinal modes. As shown, an unbalanced interferometer (such as a Mach-Zehnder interferometer) may be used to separate two laser waves with different frequencies. A delay line 217 is chosen to generate a Pi phase shift in delay time between these two lasers with different frequencies propagating in different arms of the unbalanced interferometer. Therefore, the two laser beams are separated at the unbalanced interferometer output, coupler 213. The coupler 213 will send the first laser into the CW path for the optical resonator 203, and the coupler 213 will send a second laser (that is 90 degrees out of phase with the first laser) into the CCW path of the optical resonator 203.

In some embodiments, a phase controller 211 may be controlled by a processor, circuitry, or other types of control devices to perform resonance switching. In particular, the phase controller 211 (for example, a heater or other phase controlling device) may modify the phase delay in the optical path such that the phase difference between two arms shift by 7C. Accordingly, the first laser and the second laser switch to different output arms of the coupler 213. For example, at a first time, the first laser may be propagating through the CW path, and the second laser may be propagating through the CCW path of the optical resonator 203. At a second time, a controlling device may perform an output switch to drive the phase controller 211 to change the relative phase relationship of the two output arms of the coupler 213 to cause the first laser to now propagate through the CCW path and the second laser to propagate through the CW path of the optical resonator 203. The controlling device may perform periodic output switches. For example, the controlling device directs the phase controller 211 to cause the output switches to occur periodically such that, over time, both the first laser and the second laser are propagating at the same average frequency. Output switching or resonance switching may help reduce free spectral range errors that may arise during the operation of the RFOG 200.

Additionally, the RFOG 200 may include various components 219 that prevent light from propagating back into the coupler 213 and the laser source 201. The components 219 may include circulators, isolators, or other types of optical components that allow light to be transmitted along a first transmission path and not return along the first transmission path in the opposite direction. Accordingly, backscattered light and other light emitted from the optical resonator 203 are unable to propagate back into the coupler 213, laser source 201, and other optical components of the RFOG 200. Thus, the components 219 prevent undesirable light propagating within the RFOG 200 from negatively affecting optical measurements within the RFOG 200.

As shown, the RFOG 200 may implement injection locking to drive the laser source 201 to produce lasers having launch frequencies substantially equal to two adjacent resonance frequencies of the RFOG 200 to reduce the need for high-powered lasers and expensive control loops. The lower intracavity power usage may reduce the Kerr effect and eliminate the use of high-quality intensity servo loops. Also, injection locking may allow the RFOG 200 to operate without incorporating complex Pound Dreyer Hall loops.

Figure 3:
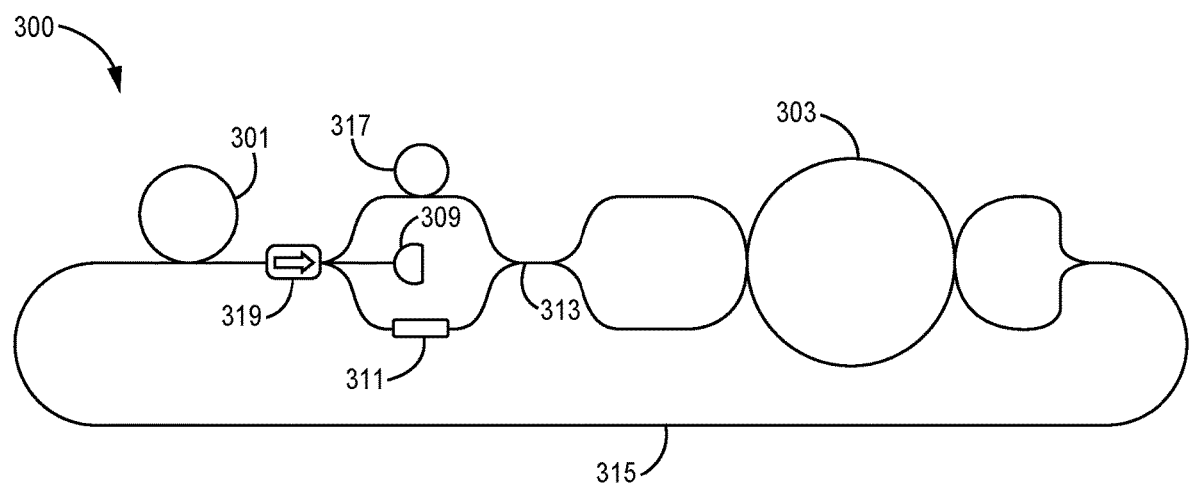
FIG. 3 is a diagram illustrating a further embodiment of an injection-locked RFOG according to an aspect of the present disclosure.

FIG. 3 is a diagram illustrating an injection-locked RFOG 300. The RFOG 300 in a substantially similar manner as the RFOG 200 described above in FIG. 2. For example, the optical resonator 303, the path 315, the rate detector 309, the coupler 313, the phase controller 311, the delay line 317, and the component 319 function substantially similar to the optical resonator 203, the path 215, the rate detector 209, the coupler 213, the phase controller 211, the delay line 217, and the component 219 in FIG. 2. However, the RFOG 300 includes a ring laser 301 as the laser source. Accordingly, the injected lasers provided to the ring laser 301 from the optical resonator 303 through the path 315 may be coupled into the ring laser 301. As the resonance of the optical resonator 303 is sufficiently close in frequency to the laser provided by the ring laser 301, the external feedback may cause the frequency of the laser provided by the ring laser 301 to track the resonance frequency of the optical resonator 303.

Figure 4:
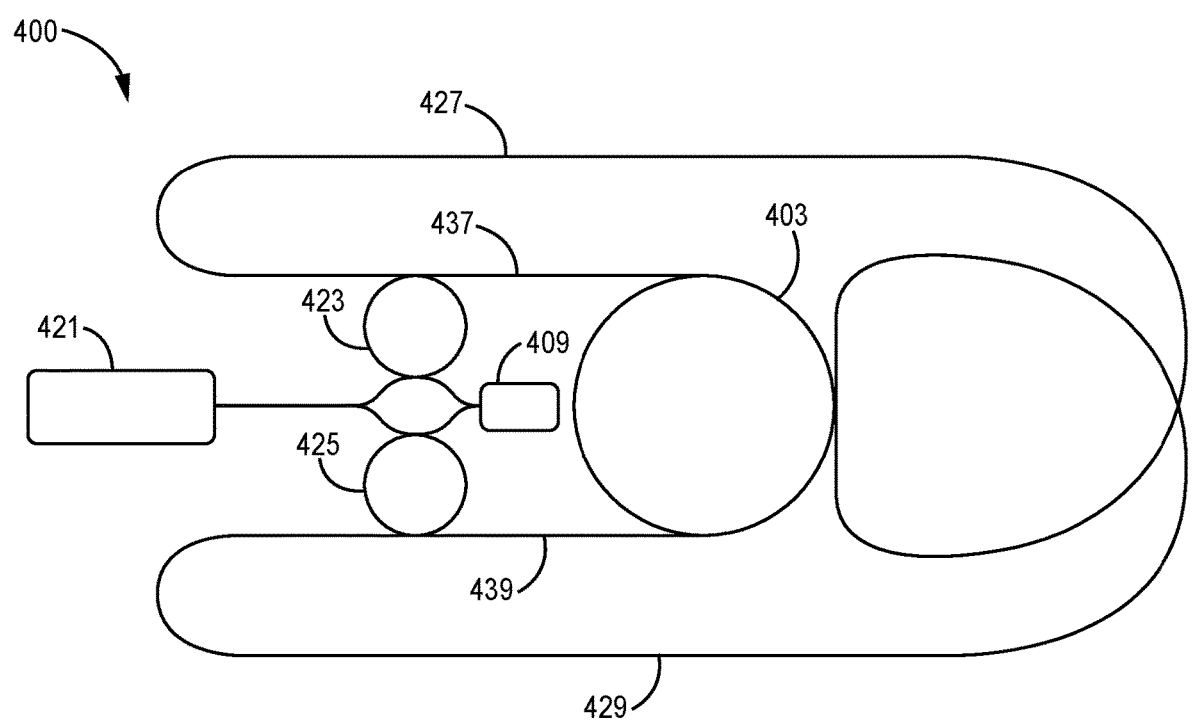
FIG. 4 is a diagram illustrating an additional embodiment of an injection-locked RFOG according to an aspect of the present disclosure.

FIG. 4 is a diagram illustrating an additional embodiment of an injection-locked RFOG 400. In contrast to the RFOG 200 and the RFOG 300, the injection-locked RFOG 400 may include multiple laser sources that each receive injection feedback at resonance frequencies of an optical resonator 403 from the optical resonator 403 that cause the laser sources to lock at the resonance frequencies. In particular, the RFOG 400 includes a first stimulated Brillouin scattering (SBS) laser source 423 and a second SBS laser source 425 as laser sources for the optical resonator 403. Additionally, to stimulate the Brillouin scattering within the first SBS laser source 423 and the second SBS laser source 425, the RFOG 400 may also include a pump source 421.

In certain embodiments, the pump laser source 421 may be any laser source capable of producing a laser at a frequency that will cause an SBS laser source to produce a laser at or near the resonance frequency of the optical resonator 403. The pump laser source 421 may produce a pump laser that is coupled into two different fiber optic rings. For example, the pump laser may be coupled into the first SBS laser source 423, which may include a first resonator ring. The pump laser is coupled into the first SBS laser source 423 in a CCW direction, stimulating Brillouin scattering in the CW direction within the first SBS laser source 423. The SBS is coupled from the first SBS laser source 423 into the optical resonator 403, such that the laser propagates in the CW direction within the optical resonator 403.

Similarly, the pump laser may be coupled into the second SBS laser source 425 in a CW direction. The pump laser may incite stimulated Brillouin scattering within the second SBS laser source 425. The SBS is coupled out of the second SBS laser source 425 and into the optical resonator 403, such that the laser propagates in the CCW direction within the optical resonator 403.

In some embodiments, the light resonates within the optical resonator 403 in a similar manner to the way that the light resonates within the optical resonator 203 and 303 described above in connection with FIGS. 2 and 3. In contrast to the RFOGs 200 and 300, where both the CW and the CCW propagating lasers are coupled out of the optical resonators and into the laser source along the same return path, the lasers propagating within the optical resonator 403 are coupled out of the optical resonator 403 and back to the first SBS laser source 423 and the second SBS laser source 425 along separate return paths. For example, the laser propagating in the CW direction within the optical resonator 403 is coupled out of the optical resonator 403 along the return path 427 such that the optical feedback is coupled into the first SBS laser source 423 in the CW direction. Similarly, the laser propagating in the CCW direction within the optical resonator 403 is coupled out of the optical resonator 403 along the return path 429 such that the output laser is coupled into the second SBS laser source 425 in the CCW direction. The return paths 427 and 429 may couple respective optical feedback through one or more of an optical fiber and an optical waveguide.

When the output optical feedback from the optical resonator 403 is coupled into the respective SBS laser sources, the output lasers from the optical resonator 403 may lock the SBS lasers to the resonance frequency of the optical resonator 403. For example, an optical feedback at the CW resonance frequency may be provided to the first SBS laser source 423 through the return path 427. As the CW resonance frequency of the optical resonator 403 is sufficiently close to the frequency of the laser provided by the first SBS laser source 423, the frequency of the laser from the first SBS laser source 423 may lock to the CCW resonance frequency of the output laser from the optical resonator 403. Similarly, an optical feedback at the CCW resonance frequency may be provided to the second SBS laser source 425 through the return path 429. As the CCW resonance frequency of the optical resonator 403 is sufficiently close to the frequency of the laser provided by the second SBS laser source 425, the frequency of the output laser from the second SBS laser source 425 may lock to the CCW resonance frequency of the output laser from the optical resonator 403. The rate detector 409, which functions similarly to the rate detectors 209 and 309 may detect rates of rotation for the RFOG 400 based on the detected beat frequency between lasers from the SBS laser sources 423 and 425.

In some embodiments, by using SBS laser sources 423 and 425 to provide the lasers for propagation within the optical resonator 403, the RFOG 400 may operate without protections against back scattering or other light propagating in the wrong direction that may be provided by the optical resonator 403 to the SBS laser sources 423 and 425 through paths 437 and 439. For example, the optical resonator 403 may provide light back towards the SBS laser sources 423 and 425 in the opposite direction of the light emitted by the SBS laser sources 423 and 425 towards the optical resonator 403. This light may include the laser provided by the other SBS laser source and backscattered light from the laser provided to the optical resonator 403. For instance, the optical resonator 403 may provide a CCW propagating optical feedback to the first SBS laser source 423, which was originally provided to the optical resonator 403 by the second SBS laser source 425. Additionally, the optical resonator 403 may provide backscattered light to the first SBS laser source 423 that is backscattered light from the CW propagating light provided by the first SBS laser source 423 to the optical resonator 403.

Similarly, the optical resonator 403 may provide a CW propagating optical feedback to the second SBS laser source 425, which was originally provided to the optical resonator 403 by the first SBS laser source 423. Additionally, the optical resonator 403 may provide backscattered light to the second SBS laser source 425 that is backscattered light from the CCW propagating light provided by the second SBS laser source 425 to the optical resonator 403. As the light provided to the first SBS laser source 423 and the second SBS laser source 425 through paths 437 and 439 enter the SBS laser sources 423 and 425 in opposite directions than the lasers emitted by the SBS laser sources 423 and 425, the unwanted laser feedback will not affect the emission of lasers toward the optical resonator 403 by the SBS laser sources 423 and 425. Thus, backscattered light does not affect the measurement of the CW and CCW resonance frequencies used to determine rotation rate information. While optical isolators in paths 437 and 439 may be used to block unwanted back-reflection, the RFOG 400 may also operate without isolators to simplify and save costs associated with gyro configurations.

Figure 5:
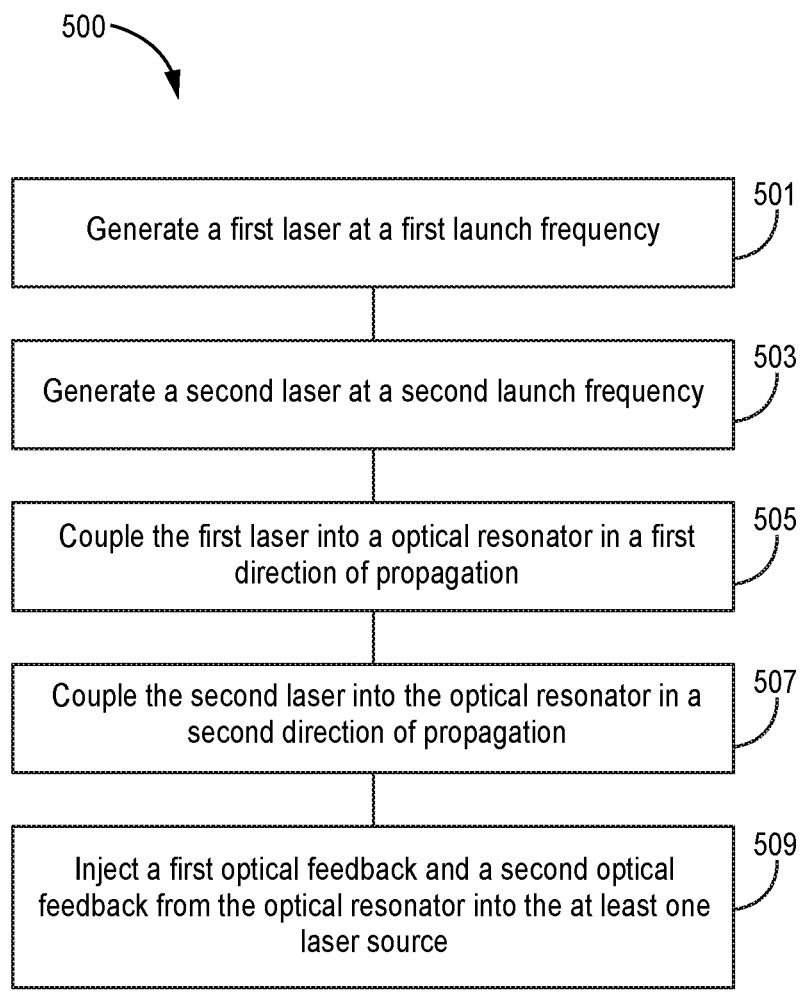
FIG. 5 is a flowchart diagram of a method for providing an injection-locked RFOG according to an aspect of the present disclosure.

FIG. 5 is a flowchart diagram of a method 500 for providing an injection-locked RFOG. The method 500 proceeds at 501, where a first laser is generated at a first launch frequency. Also, the method proceeds at 503, where a second laser is generated at a second launch frequency. Further, the method proceeds at 505, where the first laser is coupled into an optical resonator in a first direction of propagation. Moreover, the method proceeds at 507, where the second laser is coupled into the optical resonator in a second direction of propagation.

In certain embodiments, the method 500 proceeds at 509, where a first optical feedback and a second optical feedback from the optical resonator are injected into the at least one laser source. As the first output laser and the second output laser are at the resonance frequency of the fiber optic resonator, the injected first output laser and the injected second output laser may cause the first laser and the second laser to lock to the resonance frequencies of the fiber optic resonator as described above.

EXAMPLE EMBODIMENTS

Example 1 includes a system comprising: an optical resonator; at least one laser source configured to launch a first laser for propagating within the optical resonator in a first direction and launch a second laser for propagating within the optical resonator in a second direction that is opposite to the first direction, wherein the first laser is emitted by the at least one laser source at a first launch frequency and the second laser is emitted by the at least one laser source at a second launch frequency; and at least one return path that injects a first optical feedback, associated with the first laser, and a second optical feedback, associated with the second laser, from the optical resonator into the at least one laser source, wherein the first optical feedback locks the first launch frequency to a first resonance frequency of the optical resonator and the second optical feedback locks the second launch frequency to a second resonance frequency of the optical resonator.

Example 2 includes the system of Example 1, wherein the at least one laser source is a single laser source that produces the first laser at a first longitudinal mode and the second laser at a second longitudinal mode.

Example 3 includes the system of any of Examples 1-2, wherein the at least one laser source comprises a first laser source that produces the first laser and a second laser source that produces the second laser.

Example 4 includes the system of Example 3, wherein the first laser source is a first stimulated Brillouin scattering (SBS) laser source and the second laser source is a second SBS laser source.

Example 5 includes the system of Example 4, further comprising a pump laser source that emits a pump laser into the first SBS laser source and the second SBS laser source, wherein stimulated Brillouin scattering within the first SBS laser source generates the first laser and stimulated Brillouin scattering within the second SBS laser source generates the second laser.

Example 6 includes the system of any of Examples 4-5, wherein the at least one return path comprises a first return path that couples the first optical feedback into the first SBS laser source and a second return path that couples the second optical feedback into the second SBS laser source.

Example 7 includes the system of any of Examples 1-6, further comprising an unbalanced interferometer that separates the first laser and the second laser and then couples the first laser and the second laser into the optical resonator in one of the first direction and the second direction based on a delay time in an arm of the unbalanced interferometer.

Example 8 includes the system of Example 7, further comprising a phase controller configured to modify a phase delay for the unbalanced interferometer to perform output switches for the unbalanced interferometer, wherein the first laser and the second laser, output on different outputs of the unbalanced interferometer, switch between a first output of the unbalanced interferometer and a second output of the unbalanced interferometer during each output switch.

Example 9 includes the system of any of Examples 1-8, further comprising a rate detector that detects a rate of rotation based on a beat frequency of the first laser and the second laser.

Example 10 includes the system of any of Examples 1-9, wherein the at least one return path comprises at least one of: optical fiber; and optical waveguides.

Example 11 includes a method comprising: generating a first laser at a first launch frequency from at least one laser source; generating a second laser at a second launch frequency from the at least one laser source; coupling the first laser into an optical resonator in a first direction of propagation within the optical resonator, wherein the optical resonator provides a first optical feedback associated with the first direction at a first resonance frequency; coupling the second laser into the optical resonator in a second direction of propagation within the optical resonator that is opposite to the first direction, wherein the optical resonator provides a second optical feedback associated with the second direction at a second resonance frequency; and injecting the first optical feedback and the second optical feedback into the at least one laser source such that the first launch frequency locks to the first resonance frequency and the second launch frequency locks to the second resonance frequency.

Example 12 includes the method of Example 11, wherein the at least one laser source is a single laser source that produces the first laser at a first longitudinal mode and the second laser at a second longitudinal mode.

Example 13 includes the method of any of Examples 11-12, wherein generating the first laser and generating the second laser comprises: generating the first laser at a first laser source; and generating the second laser at a second laser source.

Example 14 includes the method of Example 13, wherein the first laser source is a first stimulated Brillouin scattering (SBS) laser source and the second laser source is a second SBS laser source.

Example 15 includes the method of Example 14, wherein generating the first laser and the second laser comprises: providing a pump laser to the first SBS laser source, wherein Brillouin scattering within the first SBS laser source generates the first laser; and providing the pump laser to the second SBS laser source, wherein Brillouin scattering within the second SBS laser source generates the second laser.

Example 16 includes the method of any of Examples 14-15, wherein injecting the first optical feedback and the second optical feedback into the at least one laser source comprises: coupling the first optical feedback into the first SBS laser source; and coupling the second optical feedback into the second SBS laser source.

Example 17 includes the method of any of Examples 11-16, wherein the first laser and the second laser are coupled into the optical resonator in one of the first direction and the second direction based on a phase of the first laser with respect to the second laser.

Example 18 includes the method of Example 17, further comprising a phase controller configured to periodically switch the phase of the first laser with respect to the second laser.

Example 19 includes the method of any of Examples 11-18, further comprising detecting a rate of rotation based on a beat frequency of the first laser and the second laser.

Example 20 includes a system comprising: an optical resonator; at least one laser source configured to launch a first laser for propagating within the optical resonator in a first direction and launch a second laser for propagating within the optical resonator in a second direction that is opposite to the first direction, wherein the first laser is emitted by the at least one laser source at a first launch frequency and the second laser is emitted by the at least one laser source at a second launch frequency; at least one return path that injects a first optical feedback, associated with the first laser, and a second optical feedback, associated with the second laser, from the optical resonator to the at least one laser source, wherein the first optical feedback locks the first launch frequency to a first resonance frequency of the optical resonator and the second optical feedback locks the second launch frequency to a second resonance frequency of the optical resonator; and a rate detector that detects a rate of rotation based on a beat frequency of the first laser and the second laser.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
    an optical resonator;
    at least one laser source configured to launch a first laser for propagating within the optical resonator in a first direction and launch a second laser for propagating within the optical resonator in a second direction that is opposite to the first direction, wherein the first laser is emitted by the at least one laser source at a first launch frequency and the second laser is emitted by the at least one laser source at a second launch frequency; and
    at least one return path that injects a first optical feedback, associated with the first laser, and a second optical feedback, associated with the second laser, from the optical resonator into the at least one laser source, wherein the first optical feedback locks the first launch frequency to a first resonance frequency of the optical resonator and the second optical feedback locks the second launch frequency to a second resonance frequency of the optical resonator; and
    an unbalanced interferometer that separates the first laser and the second laser and then couples the first laser and the second laser into the optical resonator in one of the first direction and the second direction based on a delay time in an arm of the unbalanced interferometer.

2. The system of claim 1, wherein the at least one laser source is a single laser source that produces the first laser at a first longitudinal mode and the second laser at a second longitudinal mode.

3. The system of claim 1, wherein the at least one laser source comprises a first laser source that produces the first laser and a second laser source that produces the second laser.

4. The system of claim 3, wherein the first laser source is a first stimulated Brillouin scattering (SBS) laser source and the second laser source is a second SBS laser source.

5. The system of claim 4, further comprising a pump laser source that emits a pump laser into the first SBS laser source and the second SBS laser source, wherein stimulated Brillouin scattering within the first SBS laser source generates the first laser and stimulated Brillouin scattering within the second SBS laser source generates the second laser.

6. The system of claim 4, wherein the at least one return path comprises a first return path that couples the first optical feedback into the first SBS laser source and a second return path that couples the second optical feedback into the second SBS laser source.

7. The system of claim 1, further comprising a phase controller configured to modify a phase delay for the unbalanced interferometer to perform output switches for the unbalanced interferometer, wherein the first laser and the second laser, output on different outputs of the unbalanced interferometer, switch between a first output of the unbalanced interferometer and a second output of the unbalanced interferometer during each output switch.

8. The system of claim 1, further comprising a rate detector that detects a rate of rotation based on a beat frequency of the first laser and the second laser.

9. The system of claim 1, wherein the at least one return path comprises at least one of:
    optical fiber; and
    optical waveguides.

10. A method comprising:
    generating a first laser at a first launch frequency from at least one laser source;
    generating a second laser at a second launch frequency from the at least one laser source;
    separating the first laser and the second laser with an unbalanced interferometer;
    coupling the first laser into an optical resonator in a first direction of propagation within the optical resonator, wherein the optical resonator provides a first optical feedback associated with the first direction at a first resonance frequency;
    coupling the second laser into the optical resonator in a second direction of propagation within the optical resonator that is opposite to the first direction, wherein the optical resonator provides a second optical feedback associated with the second direction at a second resonance frequency, wherein the first laser and the second laser are coupled into one of the first direction and the second direction based on a delay time in arm of the unbalanced interferometer;
    injecting the first optical feedback and the second optical feedback into the at least one laser source such that the first launch frequency locks to the first resonance frequency and the second launch frequency locks to the second resonance frequency; and
    detecting a rate of rotation at a rate detector based on a beat frequency of the first laser and the second laser, wherein the rate detector receives the first laser and the second laser as produced by the at least one laser source.

11. The method of claim 10, wherein the at least one laser source is a single laser source that produces the first laser at a first longitudinal mode and the second laser at a second longitudinal mode.

12. The method of claim 10, wherein generating the first laser and generating the second laser comprises:
    generating the first laser at a first laser source; and
    generating the second laser at a second laser source.

13. The method of claim 12, wherein the first laser source is a first stimulated Brillouin scattering (SBS) laser source and the second laser source is a second SBS laser source.

14. The method of claim 13, wherein generating the first laser and the second laser comprises:
    providing a pump laser to the first SBS laser source, wherein Brillouin scattering within the first SBS laser source generates the first laser; and
    providing the pump laser to the second SBS laser source, wherein Brillouin scattering within the second SBS laser source generates the second laser.

15. The method of claim 13, wherein injecting the first optical feedback and the second optical feedback into the at least one laser source comprises:
    coupling the first optical feedback into the first SBS laser source; and
    coupling the second optical feedback into the second SBS laser source.

16. The method of claim 10, wherein the first laser and the second laser are coupled into the optical resonator in one of the first direction and the second direction based on a phase of the first laser with respect to the second laser.

17. The method of claim 16, further comprising periodically switching the phase of the first laser with respect to the second laser.

18. A system comprising:

an optical resonator;

at least one laser source configured to launch a first laser for propagating within the optical resonator in a first direction and launch a second laser for propagating within the optical resonator in a second direction that is opposite to the first direction, wherein the first laser is emitted by the at least one laser source at a first launch frequency and the second laser is emitted by the at least one laser source at a second launch frequency;

at least one return path that injects a first optical feedback, associated with the first laser, and a second optical feedback, associated with the second laser, from the optical resonator to the at least one laser source, wherein the first optical feedback locks the first launch frequency to a first resonance frequency of the optical resonator and the second optical feedback locks the second launch frequency to a second resonance frequency of the optical resonator; and a rate detector coupled to receive the first laser and the second laser as produced by the at least one laser source that detects a rate of rotation based on a beat frequency of the first laser and the second laser.

\* \* \* \* \*